O. P. Allen,
Clothes Pin Machine,
Nº 7,355.
Patented May 14, 1850.
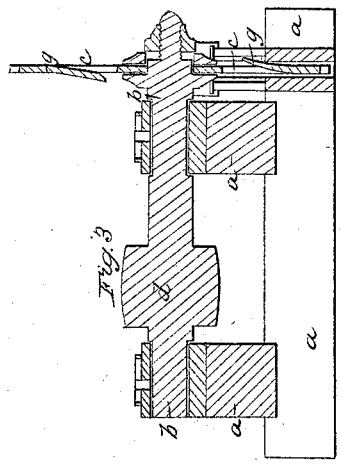
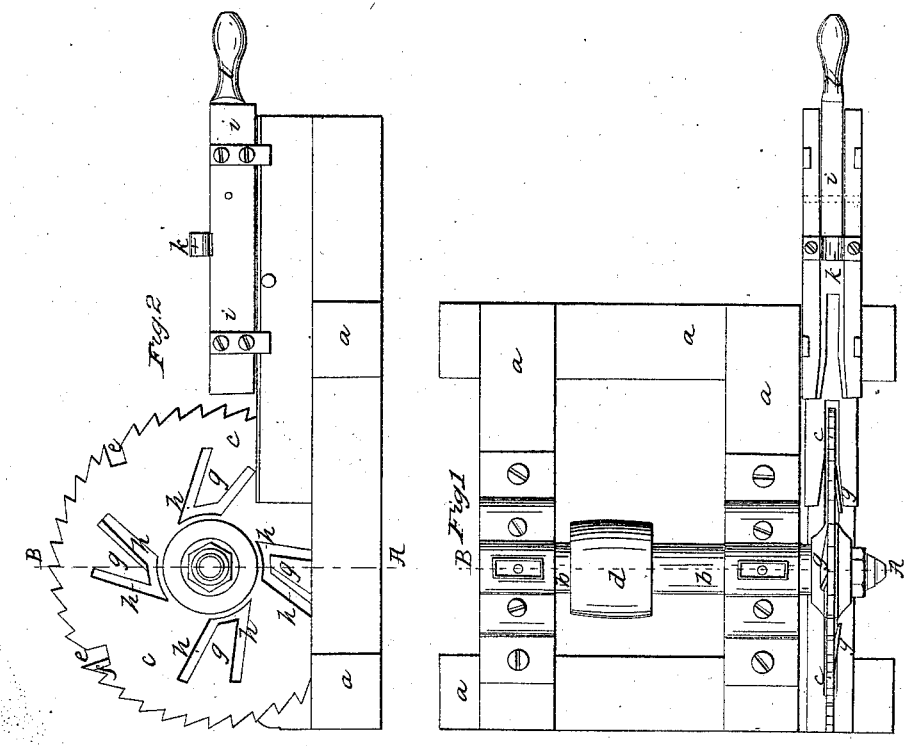

UNITED STATES PATENT OFFICE.

ORATIA P. ALLEN, OF RINDGE, NEW HAMPSHIRE.

MACHINE FOR SLITTING CLOTHES-PINS.

Specification of Letters Patent No. 7,355, dated May 14, 1850.

*To all whom it may concern:*

Be it known that I, ORATIA P. ALLEN, of Rindge, in the county of Cheshire and State of New Hampshire, have invented certain new and useful Improvements in the Machine for Cutting the Slots in Clothes-Pins, and that the following description, taken in connection with the accompanying drawings, herinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings, represent my improved machine.

Figure 1, is a plan of the same, Fig. 2 is a side elevation and Fig. 3 is a transverse vertical section taken in the plane of the line A B Figs. 1 and 2.

The object and purpose of my improvements, and the effect or result accomplished by them, is to cut the outer end of the elongated slot or fork of the pin in a spreading form (which is very desirable), and to accomplish this by knives, formed on or attached to the same circular saw which forms the straight part of the slot, and this has never been successfully accomplished, prior to the invention of my improvements.

*a a a* Figs. 1, 2 and 3 is the framework of the machine. *b b* is the revolving shaft, on one end of which, the circular saw *c c* is firmly fixed. This shaft has suitable bearings in the frame *a a a*, and has a pulley *d* between its bearings, to which power is applied by a band from any driving shaft.

The teeth of the circular saw are divided into four or more sections (two sections however would be sufficient), as shown in Fig. 1, by the openings *e, e, e, e* Fig. 2, cut into or out of the saw plate to the depth shown in said figure. The several teeth, in each of these sections, work by their points in the usual way for circular saws, and cut the straight part of the slot, and the right and left edges alternately of the front of the tooth, adjacent to each of the openings *e, e, e* is formed with a cutting edge, as shown at *f f*, which edge stands out laterally a little, so as to smooth each side of the straight part of the slot.

The radius of the circular saw should be longer than the length of the slot to be cut in the pin, and in order to spread the mouth of the slot on each side, or cut the inside of each point of the fork of the pin, on a regular sweep, which has never before been done. I form or fit knives *g, g, g, g* of proper length on the circular saw, commencing at a proper distance from the arbor of the saw, and extending toward the periphery of the same, a sufficient distance to get the required length of sweep for each end of the fork of the pin. These knives may be formed, either by cutting out the portions of the saw plate *h h h, h h h* as shown in Figs. 2 and 3 and bending out that portion of the plate, surrounded by the opening *h h* into the proper curve to cut the required sweep on the end of the fork of the pin; or they may be properly formed separately, and then fastened to the sides of the circular saw. These knives are bent out alternately, first on one side and then on the other side of the circular saw, so as to cut the two ends of the fork or slot on the proper sweep; and the edges of the knives should not be in the direction of the radii of the saw, but above the same, and so that the point in said edges nearest the periphery of the saw shall strike the pin first, and then, as the saw turns, each edge of every knife shall cut with a drawing stroke, as it is called.

The exterior form of the pin is given to it by turning it in the usual way solid, and then the pin to be cut or formed with the slot as aforesaid, is placed on the sliding block *i i* Figs. 1 and 2 properly arranged so as to move forward and back on the framework, the head being put under the metallic loop *k*, attached to said block, and being pressed and held firmly against said loop, by pressure applied to the handle of the lever *l l* Figs. 1 and 2 in a manner which will be readily understood by inspection of said Figs. 1 and 2. These knives *g g* for cutting the sweep on each outer end of the fork or slot, have never been successfully used before, and I shall, in summing up my invention, limit my claim to their combination with the circular saw as set forth.

Having thus described my improvements, I shall state my claim as follows,—

What I claim as my invention and desire to have secured to me by Letters Patent, is—

Cutting the two sides of the outer end of the slot or fork of a clothes pin on a regular sweep, by means of knives formed alternately on each side of the circular saw which cuts the straight part of said slots, and in the direction above explained, whether said knives be made of portions of the plate of said saw, and bent outward as described, or in separate pieces, and attached to said sides of said saw.

In testimony that the foregoing is a true description of my said invention and improvements I have hereto set my signature this twenty fourth day of January A D 1850.

ORATIA P. ALLEN.

Witnesses:
 DEXTER WHITTEMORE,
 THOS. W. WHITTEMORE.